Patented June 6, 1933

1,913,202

UNITED STATES PATENT OFFICE

EUGENE VICTOR HAYES-GRATZE, OF KENSINGTON, LONDON, ENGLAND

PROCESS FOR THE EXTRACTION AND TREATMENT OF VEGETABLE FIBERS AND THE PRODUCT RESULTING THEREFROM

No Drawing. Application filed August 19, 1931, Serial No. 558,102, and in Great Britain September 12, 1930.

This invention relates to a new or improved process for the extraction and treatment of vegetable fibers and the products resulting therefrom, and is more particularly applicable to the treatment of New Zealand hemp, (*Phormium tenax*), pita hemp (*Agave americana*), pita grass (*Aloe sisalana*) and other plants having bast fibers but is also applicable to flax and cotton.

In treating the leaves of such plants, it has been usual to first beat, crush and mechanically remove a portion of the useless tissues, then remove the loose vegetable matter from the fibers either by washing with water in suitable machines, or by a fermenting or retting process in soft water, after which the product is washed, dried and bleached by exposure to sunlight and finally "scutched" to remove the remaining surplus vegetable matter and separate the fibers. The raw hemp is then hackled or combed and spun for use in making twine and rope. The chief objections to the known processes are the time and labour occupied, the injury to the fibers, due to the drastic beating they receive during such processes, and waste of fibers. The objects of the present invention are not only to overcome the above drakbacks, but to produce a product which can be used for other purposes than rope and twine spinning and that at a substantial reduction in cost and time over known processes.

The present invention consists in extracting and treating vegetable fibers with a reagent (or an aqueous solution thereof) prepared by treating a neutralized sulphonated oil to an electric ionization process either by electrolysis or by the action of high tension or high frequency discharges or by a combination of both.

Any suitable ionized oil may be employed, either a vegetable oil, a mineral oil, an animal oil or a fish oil, but preferably a vegetable oil such as castor or olive oil is employed.

In the preferred method of carrying out the process according to the present invention, castor oil is first sulphonated, rendered neutral and then treated to an electric ionization process whereby the degree of ionization after dilution with 10 times the amount of water has pH value of not less than 7.

When the electric ionization process is effected by electrolytic action by means of a low tension current only a minute quantity of ozone is liberated and to increase the impregnation of the ionized oil with ozone—in order to produce a bleaching effect—the sulphonated oil may be electrically ionized by a high tension or high frequency discharge or the ionized oil which has first been treated to electrolysis may be again treated to a high tension or high frequency discharge whereby the pH value is readily increased to 7.5 or 8 which is of particular value when the fleshy matter of the leaves or stems to be treated is practically hard or tough.

The ionization value of an oil which may be increased by ozonization depends on the pH value of its aqueous solution. The pH value is a number used to express the hydrogen ion concentration of a liquid and depends upon its active acidity or alkalinity with decreasing acidity the corresponding pH values increase. According to the theory of electrolytic dissociation, all liquids, of which water is a constituent, contain free hydrogen and hydroxyl ions, if an excess of hydrogen ions be present the liquid is acid, and if alkaline then there is an excess of hydroxyl ions. Since the ionization value of liquid depends on the grammes of ionized hydrogen per litre, the pH value determines the degree of ionization, for example $pH1=0.1$ grammes of ionized hydrogen per litre, $pH2=0.01$ grammes of ionized hydrogen per litre, and so on to 14 decimal places. There are two methods of measuring pH values, the electrometric method in which the difference in potential between the hydrogen electrode immersed in the solution and a standard calomel electrode is measured and converted by calculation into pH and the more usually employed colorimetric method, which depends upon the use of indicators, which latter consist of organic colouring matters which change colour according to the pH of the liquid in which they are dissolved.

In order to test the pH value of a solution by the colorimetric method, an acid indicator, for instance such as phenolphthalein may be used. Phenolphthalein is colourless in the undissociated state, that is in the presence of a trace of hydrogen ions, but as soon as the solution becomes alkaline the strongly dissociated salt of phenolphthalein is formed and the intense red of its negative ions appear. By comparison with a set of numbered standard tubes of varying colour intensity, the exact pH value of the solution under test may be obtained and such standard tubes constitute what is commonly known as the "Phenol scale".

Such an ionized oil is then preferably aerated and/or diluted with a certain amount of water, say for instance 1 part (by volume) of oil to 25 parts of water and heated from 50° to 110° C.

In some cases any known bleaching agent may be added to the diluted oil, and it has been found in practice that such a bleaching agent may well be hydrogen peroxide, sodium hypochlorite, sulphur dioxide, sodium peroxide, sodium bisulphite, or sodium hydrosulphite, a suitable percentage of the diluted solution is from 1 to 3% of hydrogen peroxide, or from 1 to 5% of sodium hypochlorite, sulphur dioxide, sodium peroxide, sodium bisulphite or sodium hydrosulphite.

In order to expedite the action of the ionized oil or a solution thereof on the leaves or stems of the plants to be treated, it is preferable to subject them to a preliminary mechanical operation whereby the flinty or green coloured skin or envelope is broken up or removed and if necessary to partly break up the adhesion of the fibers. Such a mechanical operation may consist in scraping or serrating the outer skin or envelope by a toothed instrument, for instance by passing the leaves or stems between toothed rollers, or by perforating or pricking the skin, or by rolling at a pressure which is not sufficient to injure the internal fibers. After, or during, such preliminary operation the above heated solution is employed which so softens the surplus vegetable matter as to allow it to be readily removed by pressure, for instance by a simple rolling operation or by a simple scutching or similar operation.

In most cases, the treatment effectively removes the bulk of fleshy matter and precipitates byproducts without scutching, the operation depending to a considerable extent on the temperature of the solution and period of immersion.

When a bleaching agent is not added to the bath, the extracted fibers may be subsequently bleached.

The resultant product may be graded, combed and spun and since the whole of the finer fibers, which by known processes are wasted in the form of tow, are retained, it becomes possible to form a yarn suitable for weaving.

I declare that what I claim and desire to secure by Letters Patent is:—

1. A process for the extraction and treatment of vegetable fibers consisting in treating said fibers with a diluted re-agent prepared by treating a neutralized sulphonated oil to an electric ionization process, as set forth.

2. A process for the extraction and treatment of vegetable fibers consisting in treating said fibers with a re-agent prepared by treating a neutralized sulphonated oil to an electric ionization process whereby such ionized oil after dilution with ten times the amount of water has a pH value of not less than 7, as set forth.

3. A process for the extraction and treatment of vegetable fibers consisting in treating said fibers with a diluted re-agent prepared by treating a neutralized sulphonated oil to an electric ionization process by the action of a high tension discharge, as set forth.

4. A process for the extraction and treatment of vegetable fibers consisting in treating said fibers with a re-agent prepared by treating a neutralized sulphonated oil to an electric ionization process diluting said re-agent with water and adding thereto a bleaching agent, as set forth.

5. A process for the extraction and treatment of vegetable fibers from plants having bast fibers consisting in first subjecting the leaves or stems of the plants to a mechanical operation whereby the flinty or green coloured skin or envelope is broken up or removed, and then steeping the fibers in a heated bath consisting of a neutralized sulphonated oil treated to an electric ionization process and diluted with about 25 parts of water heated from 50° C. to 110° C., as set forth.

EUGENE VICTOR HAYES-GRATZE.